United States Patent
Rossi

[11] Patent Number: 5,949,340
[45] Date of Patent: Sep. 7, 1999

[54] WARNING SYSTEM FOR DETECTING PRESENCE OF A CHILD IN AN INFANT SEAT

[76] Inventor: Marc A. Rossi, 43473 Golden Meadow Cr., Ashburn, Va. 20147

[21] Appl. No.: 09/123,739

[22] Filed: Jul. 28, 1998

[51] Int. Cl.⁶ .................................................. G08B 23/00
[52] U.S. Cl. .................................. 340/573.1; 340/425.5; 340/457; 340/667
[58] Field of Search ............................... 340/425.5, 426, 340/573.1, 457, 667, 522, 438, 572.4, 573.4; 180/273; 280/732, 730.1, 735

[56] References Cited

U.S. PATENT DOCUMENTS

| | | | |
|---|---|---|---|
| 5,054,686 | 10/1991 | Chuang | 236/49.3 |
| 5,243,323 | 9/1993 | Rogers | 340/433 |
| 5,404,128 | 4/1995 | Ogino et al. | 340/425.5 |
| 5,482,314 | 1/1996 | Corrado et al. | 280/735 |
| 5,581,234 | 12/1996 | Emery et al. | 340/457.1 |
| 5,618,056 | 4/1997 | Schoos et al. | 280/735 |
| 5,783,871 | 7/1998 | LeMense | 307/10.1 |
| 5,793,291 | 8/1998 | Thornton | 340/584 |
| 5,829,782 | 11/1998 | Breed et al. | 280/735 |
| 5,831,389 | 11/1998 | Kawashima et al. | 315/77 |

*Primary Examiner*—Jeffery A. Hofsass
*Assistant Examiner*—Van T. Trieu
*Attorney, Agent, or Firm*—Rossi & Associates

[57] ABSTRACT

An apparatus is provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

20 Claims, 2 Drawing Sheets

WARNING SYSTEM FOR DETECTING PRESENCE OF A CHILD IN AN INFANT SEAT

FIELD OF THE INVENTION

The invention relates in general to system for detecting the presence of an automobile occupant. In particular, the invention relates to system for generating an alarm when the vehicle has been turned off and a child has been left in an infant seat.

BACKGROUND OF THE INVENTION

There have been a number of tragic deaths in which children have been mistakenly left in automobiles after the driver had reached their location and left the vehicle. The deaths have usually been caused by a buildup of excessive heat or excessive cold within the vehicle during the day.

In view of the above, it is an objective of the invention to provide a warning when a child has been left in the infant seat and the vehicle has been turned off.

SUMMARY OF THE INVENTION

The invention provides an apparatus for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

DETAILED DESCRIPTION OF THE PREFERRED EMBODIMENTS

Figure 1:
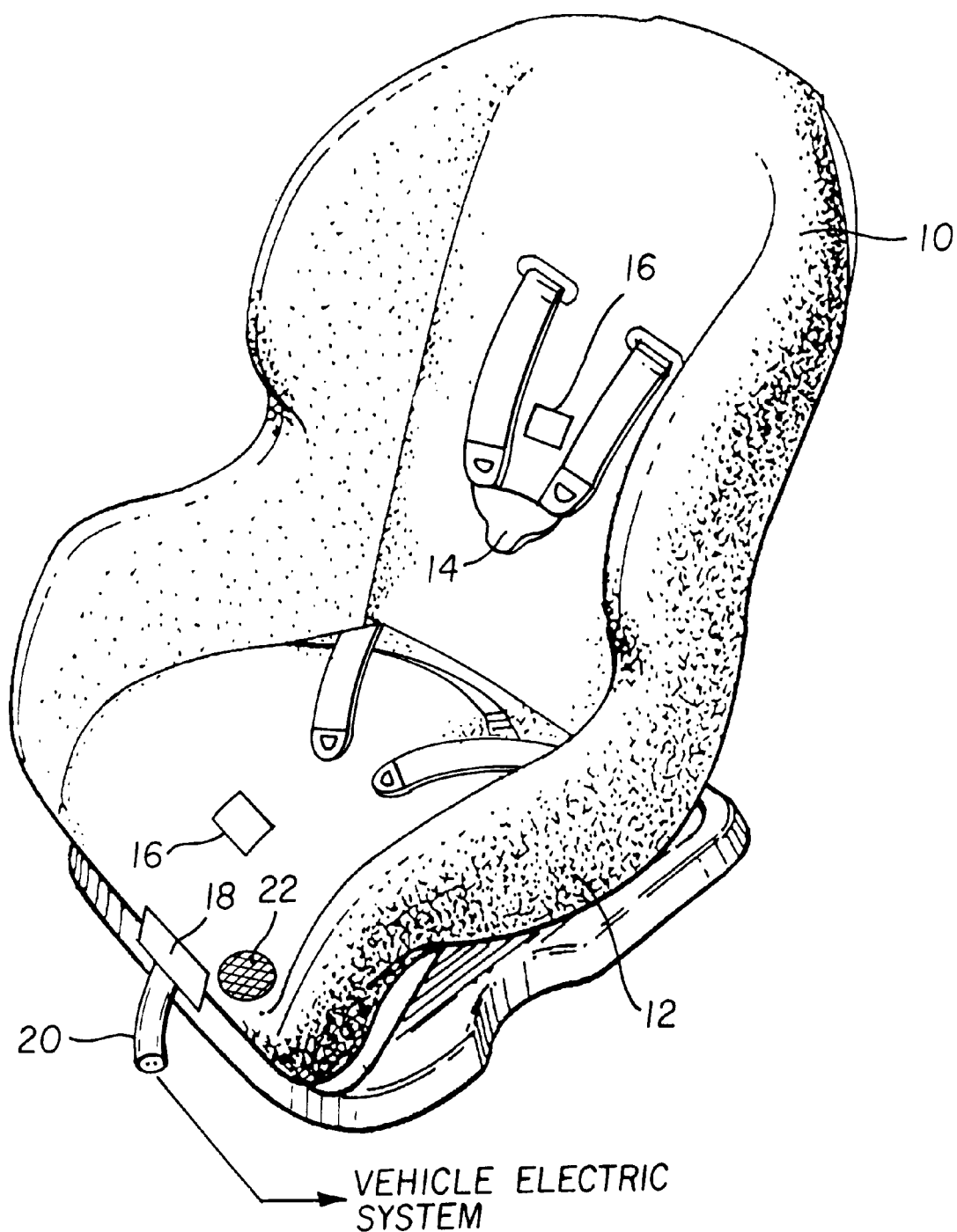
FIG. 1 illustrates an infant seat in accordance with the invention.
Figure 2:
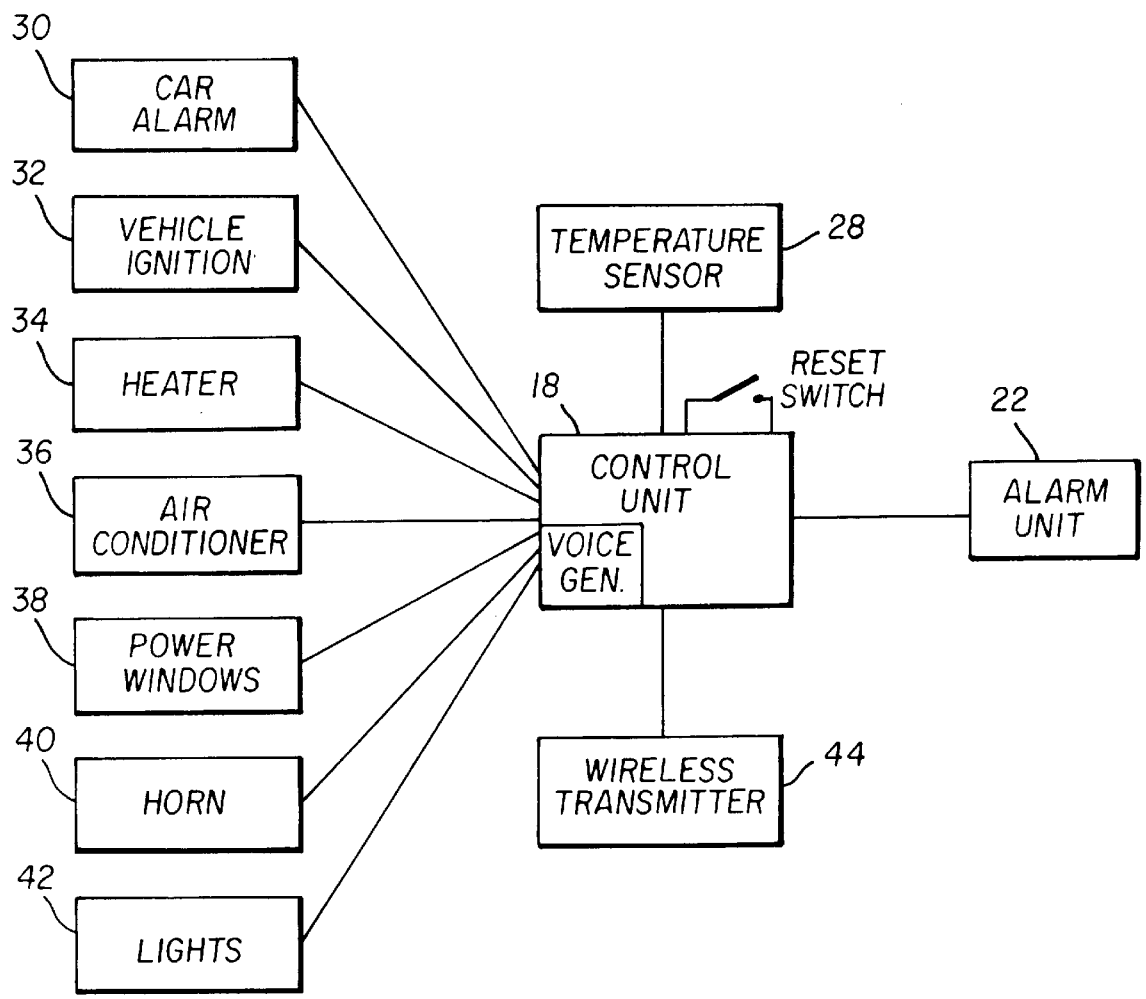
FIG. 2 is a block diagram illustrating the connection of a control unit to various components of a vehicle into which the infant seat of FIG. 1 is placed.

FIG. 1 illustrates an automobile infant seat in accordance with the present invention including a back 10, a seat 12 and a safety harness 14. Although not specifically illustrated, the frame of the seat is adapted to be fastened into place within an automobile in a conventional manner using the seat belts of the automobile. Alternatively, the infant seat may include a base unit that remains within the vehicle and a seat unit that attaches to the base unit in a conventional manner. The infant seat also includes an occupant sensor 16 preferably located in the back 10 and/or the seat 12, although it may be located anywhere within the seat or within the vehicle into which the seat is placed as will be described. The occupant sensor 16 comprises any means for detecting the presence of an occupant in the infant seat, including a mechanical switch, an optical detector, a heat detector and a weight detector. The occupant sensor 16 generates a signal indicative of the presence of an occupant being located in the seat that is sent to a control unit 18 that is located within the seat or alternatively within the vehicle into which the seat is placed. An electrical connector 20 is also provided, that enables the control unit 18 to be coupled to the electrical system of the vehicle. The electrical connector 20 preferably provides a power connection so that power is supplied to the control unit 18, and at least an ignition "On" connection, for example a connection to the ignition circuit 32 illustrated in FIG. 2, so that the control unit 18 can detect whether the vehicle ignition is on or off.

In operation, the infant seat is placed within a vehicle and a child is placed within the infant seat for transport within the vehicle. The occupant sensor 16 supplies a signal to the control unit 18 indicating that the seat is occupied. At this point, the control unit 18 preferably provides a signal to an alarm unit 22, for example a light, buzzer or a speaker, to remind the vehicle driver to fasten the safety harness 14. For example, the control unit 18 preferably includes a voice generator that sends a signal to the alarm unit 22 to sound a message "PLEASE FASTEN THE SAFETY HARNESS". Still further, a sensor (not shown) can be included within the safety harness 14 to indicate to the control unit 18 that the safety harness 14 has in fact been fastened, thereby signaling the control unit 18 to discontinue the warning message. Once the child is properly secured in the seat, the driver proceeds to drive the vehicle to the desired destination.

Upon reaching the destination, the driver will turn off the ignition of the vehicle. At this point, the control unit 18, having sensed that the ignition is off, preferably generates an alarm to remind the vehicle driver that the child is still in the seat. For example, the voice generator of the control unit 18 generates a message stating "PLEASE REMOVE CHILD FROM SEAT". The message is repeated if the child is not removed from the seat within a specified period.

Although it is believed that the above reminder should be sufficient to remind the driver to remove the child from the seat, it may still be possible that the driver is distracted and ignores the message. If the child has not been removed within a further predetermined time, then it must be presumed that the driver has left without taking the child. Accordingly, it may be necessary to provide for a more urgent warning. In a further embodiment, the connector 20 also provides a connection to one or more of the vehicle's car alarm 30, horn circuit 40 and light circuit 42, so that the control unit 18 can activate the vehicle's car alarm (if so equipped), the horn and/or the lights of the vehicle to attract attention if the further predetermined time period has lapsed. In a still further embodiment, a temperature sensor 28 is provided to sense the temperature within the vehicle. If the temperature exceeds a predetermined limit, the control unit 18 can activate the power window circuit 38 of the vehicle to open the windows and/or turn on a cooling fan (not shown). Alternatively, the control unit 18 can activate the vehicle ignition circuit to start the vehicle, and further control the air conditioning unit 36 and the heater 34 of the unit to maintain the temperature at a safe setting. Still further, the control unit 18 can activate a transmitter 44 to transmit an emergency message to a remote location. The transmitter 44, for example, can include the vehicle's cellular phone, a transmitter used as a vehicle locator in case of theft or any other type of wireless transmitter.

It will be apparent to one of ordinary skill in the art that various components discussed above can be incorporated into either the infant seat or the vehicle into which the infant seat is to be placed. The control unit 18, for example, may be implemented utilizing the vehicle's own on board computer. The occupant sensor 14 may be implemented utilizing sensors within the compartment of the vehicle. Accordingly, the system can either be vehicle based, seat based or a combination of both.

The invention has been described with reference to certain preferred embodiments thereof. It will be understood, however, that modifications and variations are possible within the scope of the appended claims. The control unit 18, for example, can be implemented utilizing programed general purpose processors, application specific processors, firmware and discrete components or combinations thereof. Still further, although it is preferred that the control unit 18 detect the state of the vehicle ignition, a separate sensor or detection unit can be employed to detect the state of the vehicle ignition and supply a signal to the control unit. And still further, there may be times when the driver does not wish to remove the child immediately from the infant seat upon deactivation of the ignition. In such cases, a reset switch can be provided to allow the driver to reset the time period counted by the control unit prior to activation of the alarm.

What is claimed is:

1. An apparatus comprising:

means for detecting a presence of an occupant within an infant seat located within a vehicle;

means for detecting a state of a vehicle's ignition system;

means for generating an alarm signal when the detection means detects the presence of an occupant within the infant seat and the means for detecting the state of the vehicle's ignition system detects that the vehicle's ignition system has been turned from an "on" state to an "off" state; and means for generating an alarm in response to the alarm signal.

2. An apparatus as claimed in claim 1, wherein the means for detecting the presence of an occupant comprises an occupant sensor located within the infant seat.

3. An apparatus as claimed in claim 1, wherein the means for generating an alarm signal comprises a voice generator.

4. An apparatus as claimed in claim 1, wherein means for generating an alarm comprises at least one of a buzzer, a light and a speaker.

5. An apparatus as claimed in claim 1, wherein the means for generating an alarm signal controls the operation of a theft alarm of the vehicle after a predetermined time period if the occupant sensing means indicates that the occupant has not been removed from the infant seat.

6. An apparatus as claimed in claim 1, wherein the means for generating an alarm signal controls the operation of a transmitter to transmit an emergency signal after a predetermined time period if the occupant sensing means indicates that the occupant has not been removed from the infant seat.

7. An apparatus as claimed in claim 1, wherein the means for generating an alarm signal controls the operation of an ignition system of the vehicle after a predetermined time period if the occupant sensing means indicates that the occupant has not been removed from the infant seat.

8. An apparatus as claimed in claim 1, wherein the means for generating an alarm signal controls the operation of a heater of the vehicle after a predetermined time period if the occupant sensing means indicates that the occupant has not been removed from the infant seat.

9. An apparatus as claimed in claim 1, wherein the means for generating an alarm signal controls the operation of an air conditioner of the vehicle after a predetermined time period if the occupant sensing means indicates that the occupant has not been removed from the infant seat.

10. An apparatus as claimed in claim 1, wherein the means for generating an alarm signal controls the operation of power windows of the vehicle after a predetermined time period if the occupant sensing means indicates that the occupant has not been removed from the infant seat.

11. An apparatus as claimed in claim 1, wherein the means for generating an alarm signal controls the operation a horn of the vehicle after a predetermined time period if the occupant sensing means indicates that the occupant has not been removed from the infant seat.

12. An apparatus as claimed in claim 1, wherein the means for generating an alarm signal controls the operation of lights of the vehicle after a predetermined time period if the occupant sensing means indicates that the occupant has not been removed from the infant seat.

13. A system for detecting a presence of an occupant in an infant seat located within a vehicle, said system comprising:

a sensor that generates a signal indicative of whether the occupant is present in the infant seat; and a control unit coupled to the sensor and an ignition system of the vehicle, wherein the control unit generates an alarm signal when the signal generated by the sensor is indicative of the presence of an occupant in the infant seat and the ignition system of the vehicle is off.

14. A system as claimed in claim 13, wherein the control unit generates the alarm signal a predetermined time period after a state of the ignition system of the vehicle has been turned from on to off.

15. A system as claimed in claim 14, further comprising a reset switch that, upon activation, resets the predetermined time period.

16. A system as claimed in claim 13, wherein the control unit is located within a structure of the vehicle.

17. A system as claimed in claim 13, wherein the control unit is located within a structure of the infant seat.

18. A system as claimed in claim 13, further comprising an alarm unit coupled to the control unit, wherein the alarm unit generates an alarm in response to the alarm signal.

19. A system as claimed in claim 13, wherein the control unit controls the operation of at least one a theft alarm, a heater, an air conditioner, power windows, a horn and lights of the vehicle if the occupant is not removed from the infant seat within a predetermined time period.

20. A system as claimed in claim 13, further comprising a wireless transmitter coupled to the control unit, wherein the wireless transmitter transmits an alarm in response to the alarm signal generated by the control unit.

* * * * *